UNITED STATES PATENT OFFICE.

HENRY C. McMILLIN, OF CLARKSBURG, WEST VIRGINIA, ASSIGNOR OF ONE-HALF TO PATRICK F. McDONNELL, OF SAME PLACE.

PLASTERING COMPOSITION.

SPECIFICATION forming part of Letters Patent No. 678,010, dated July 9, 1901.

Application filed March 25, 1901. Serial No. 52,759 (No specimens.)

*To all whom it may concern:*

Be it known that I, HENRY C. MCMILLIN, a citizen of the United States, residing at Clarksburg, in the county of Harrison and State of West Virginia, have invented a new and useful Plastering Composition, of which the following is a specification.

This invention relates to a composition of matter to be used as a hard plaster for brown-plastering walls of buildings and the like.

The object of the invention is to present a plaster that may readily be applied in the usual manner to lath, brick, or stone walls and worked to a smooth and finished surface, that shall from its power to resist the action of time and weather possess superior durability, that will not be disposed to crack or buckle-lath, that shall be waterproof, and that will increase in firmness and stability with age.

The composition matter consists of the following ingredients, combined in about the proportions given, by weight—namely, calcined plaster, sixty (60) pounds; domestic cement, forty (40) pounds; sharp clean sand, two hundred and fifty (250) pounds; sulfate of zinc, two (2) ounces; grape-sugar, eight (8) ounces; hair, eight (8) ounces, and water, one hundred and sixty (160) pounds. In combining these ingredients I first thoroughly mix in a dry state by means of suitable machinery the calcined plaster, domestic cement, sand, sulfate of zinc, grape-sugar, and hair. I then add water in suitable quantity to the dry mixture to reduce the same to the proper consistency to spread evenly with a trowel. This may be effected by placing the dry mixture in one end of a mixing-box and by use of a common hoe, such as used by plasterers, thoroughly mix the composition with the water up to the full quantity.

While the proportion of water with relation to the other ingredients is the quantity that will generally be used, it is to be understood that the volume may be varied somewhat as circumstances may require, as it is obvious that the desideratum is to bring the dry mixture to the proper consistency to permit the plaster being applied to various kinds of walls.

I am aware that some of the ingredients herein enumerated have before been employed in plastering compositions, and these I do not lay specific claim to; but what I do claim is the composition of matter *per se* specifically pointed out.

Having thus fully described my invention, what I claim as new, and desire to secure by Letters Patent, is—

1. A composition of matter for use as a plaster consisting of calcined plaster, domestic cement, sand, sulfate of zinc, grape-sugar, hair, and water, substantially in the proportions specified.

2. A composition of matter for use as a plaster, consisting of the following ingredients by weight: calcined plaster, sixty (60) pounds, domestic cement, forty (40) pounds, sharp clean sand, two hundred and fifty (250) pounds, sulfate of zinc, two (2) ounces, grape-sugar, eight (8) ounces, hair, eight (8) ounces, and water, one hundred and sixty (160) pounds.

HENRY C. McMILLIN.

Witnesses:
 JOHN H. QUILHOF,
 M. S. RILEY.